even if it

United States Patent
Grygera et al.

[15] 3,694,662
[45] Sept. 26, 1972

[54] CROSS REFERENCE POWER SUPPLY

[72] Inventors: James W. Grygera, Racine; James R. Charlton; Kenneth S. Swenson, both of Kenosha, all of Wis.

[73] Assignee: Eaton Corporation, Cleveland, Ohio

[22] Filed: June 10, 1971

[21] Appl. No.: 151,663

[52] U.S. Cl. .................. 307/24, 307/34, 317/33 VR, 323/20, 323/25
[51] Int. Cl. ............................................. G05f 1/58
[58] Field of Search ............... 307/12, 20, 24, 31–37, 307/85, 86, 87; 317/33 VR; 323/22 T, 20, 24, 25

[56] References Cited

UNITED STATES PATENTS

| | | | |
|---|---|---|---|
| 3,504,272 | 3/1970 | Kenney | 323/22 T |
| 3,090,905 | 5/1963 | Ehret | 317/33 V |
| 3,509,448 | 4/1970 | Bland | 323/25 X |
| 3,204,175 | 8/1965 | Kuriger | 323/22 T |
| 3,571,604 | 3/1971 | La Porta | 307/24 |

Primary Examiner—Gerald Goldberg
Attorney—Teagno & Toddy

[57] ABSTRACT

A cross reference regulated power supply including a first regulated power supply having an output terminal for establishing a positive regulated voltage thereon, a second regulated power supply having an output terminal for establishing a negative regulated voltage thereon, a first sensor connected to the output terminal of the first regulated power supply for sensing the first output voltage and directing a signal to an input of the second regulated power supply to deenergize the second regulated power supply in the event the output voltage of the first power supply varies by a predetermined amount, and a second sensor connected to the output terminal of the second regulated power supply for sensing the output voltage thereon and directing a signal to an input of the first power supply to deenergize the first power supply in the event the voltage on the second power supply output varies by a predetermined amount.

14 Claims, 1 Drawing Figure

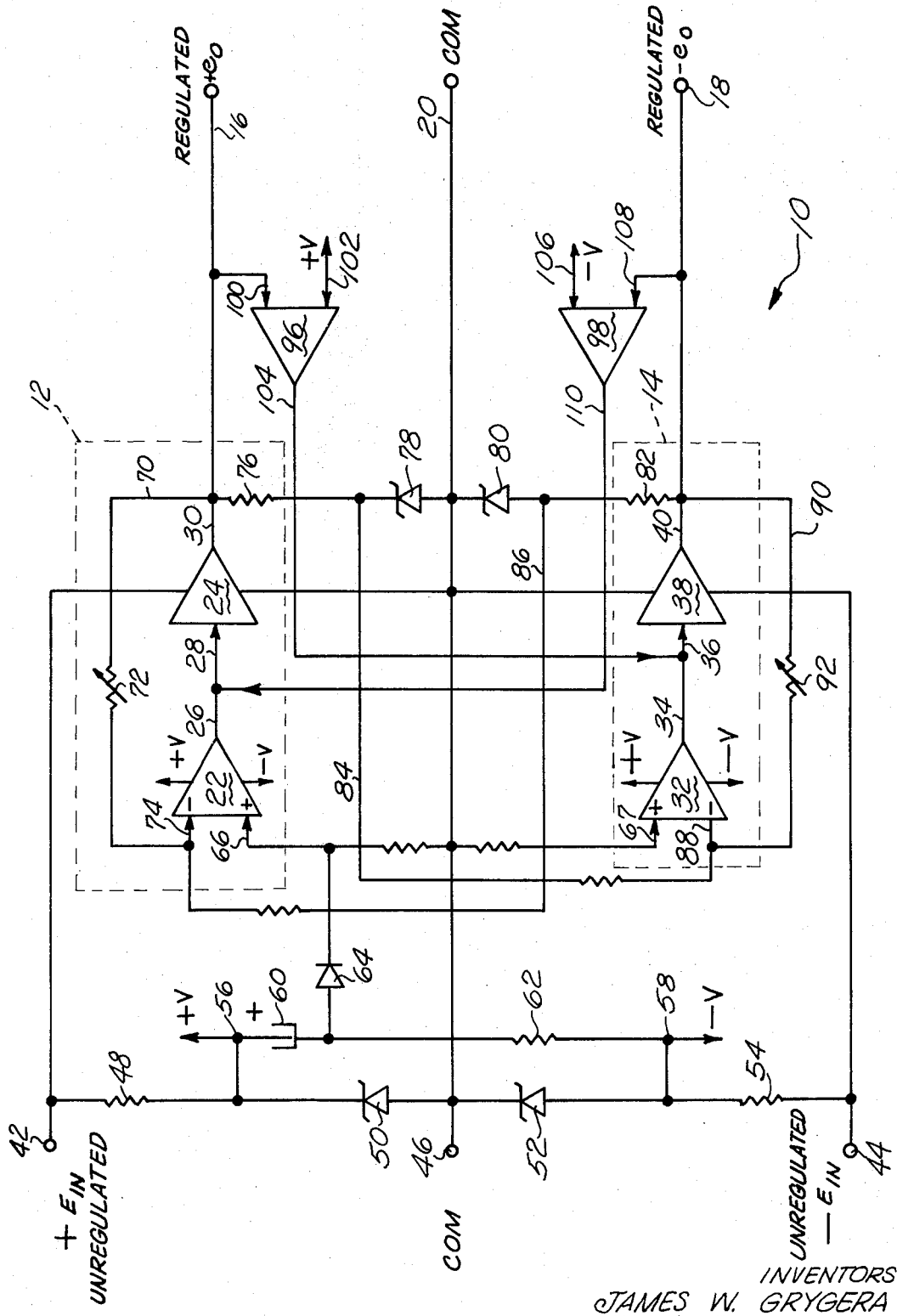

CROSS REFERENCE POWER SUPPLY

The present invention relates to a regulated power supply and more specifically to a cross reference regulated power supply for establishing a first regulated voltage and a second regulated voltage and means for sensing the first and second regulated voltages and deenergizing the first regulated voltage in the event the second regulated voltage varies by a predetermined amount and deenergizing the second regulated voltage in the event that the first regulated voltage varies by a predetermined amount.

Power supplies are known which provide first and second regulated voltages. Some of these known power supplies include overload protection means which operate to deenergize the first regulated voltage supply in the event the first regulated voltage exceeds a predetermined voltage and shut down the second regulated voltage supply in the event the second regulated voltage exceeds a predetermined voltage. However, when one of the regulated voltages is shut down the other is not necessarily shut down. Since the first and second output voltages are generally utilized to power common circuitry the shutting down of one of the voltages due to overload thereof without shutting down the other voltages is undesirable since a portion of the common circuitry will be continued to be energized while a portion will be shut down. The partial energization of the common circuitry may lead to destruction of part of the circuitry and is therefore undesirable.

Accordingly, it is an object of the present invention to provide a new and improved regulated power supply which overcomes the hereinabove discussed disadvantages and which includes a first output terminal having a first regulated voltage thereon, a second output terminal having a second regulated voltage thereon, means for deenergizing the first output terminal in response to the second regulated voltage varying by a predetermined amount from a predetermined level and means for deenergizing the second output terminal in response to the first regulated voltage varying by a predetermined amount from a predetermined level.

Another object of the present invention is to provide a new and improved regulated power supply including a first power supply for establishing a first regulated voltage on a first power supply output, a second power supply for establishing a second regulated voltage on a second power supply output, first sensing means for sensing the voltage on the first power supply output and directing a signal to an input of the second regulated power supply to deenergize the second regulated power supply in the event the voltage on the first power supply output varies by a predetermined amount from a first predetermined regulated voltage and second sensing means for sensing the output voltage on the second power supply output and directing a signal to an input to the first regulated power supply to deenergize the first regulated power supply in the event the voltage on the second power supply output varies by a predetermined amount from a second predetermined regulated voltage.

A further object of the present invention is to provide a new and improved regulated power supply including a first amplifier, a second amplifier connected to the output of the first amplifier and having an output terminal for establishing a first predetermined regulated voltage thereon, a third amplifier, a fourth amplifier connected to the third amplifier and having an output terminal for establishing a second predetermined regulated voltage thereon, a first feedback circuit for directing a voltage having a magnitude dependent on the voltage on the output terminal of the second amplifier to the input of the first amplifier, a first reference feedback circuit for directing a reference feedback voltage having a magnitude dependent on the magnitude of the voltage on the output of the fourth amplifier to the input of the first amplifier, a second feedback circuit for directing a feedback voltage having a magnitude dependent on the magnitude of the voltage on the output terminal of the fourth amplifier to the input of the third amplifier, a second reference feedback circuit for directing a reference feedback voltage having a magnitude dependent on the magnitude of the voltage on the output of the second amplifier to the input of the third amplifer, first sensing means for sensing the voltage on the output of the second amplifier and directing a signal to the input of the fourth amplifier when the voltage sensed thereby varies by a predetermined amount to deenergize the fourth amplifier and second sensing means for sensing the voltage on the output of the fourth amplifier and directing a signal to the input of the second amplifier when the voltage sensed thereby varies by a predetermined amount to deenergize the second amplifier.

Further objects and advantages of the present invention will become apparent from the following detailed description of the preferred embodiment of the invention taken in conjunction with the drawing wherein:

The FIGURE schematically illustrates a block diagram of the present invention.

The present invention relates to a regulated power supply and more specifically to a regulated power supply for producing a first and a second regulated voltage. The regulated power supply includes a first power supply for establishing the first regulated voltage on a first output terminal and a second regulated power supply for establishing the second regulated voltage on a second output terminal. First sensing means are provided for sensing the voltage on the first output terminal and directing a signal to deenergize the second power supply in the event that the first regulated voltage varies by a predetermined amount. Second sensing means are associated with the second output terminal for sensing the voltage thereon and directing a signal to the first power supply to deenergize the first power supply in the event that the second regulated voltage varies by a predetermined amount. When the first sensing means senses a predetermined variance in the first output voltage the first sensing means will act to deenergize the second regulated power supply. The second regulated output voltage will then go to zero and the second sensing means will then act to deenergize the first regulated power supply. Accordingly, a variance in the output voltages of one of the power supplies will deenergize both of the power supplies.

Referring to the Figure the regulated power supply 10 is illustrated therein. The regulated power supply 10 is generally composed of a first power supply 12 and a second power supply 14. The first power supply 12 includes an output terminal 16 upon which the first power supply establishes a positive regulated voltage.

The second power supply 14 includes an output terminal 18 upon which the second power supply establishes a negative regulated voltage. A common terminal 20 is associated with both the first power supply 12 and the second power supply 14.

The first power supply 12 includes an operational amplifier 22 and an amplifier 24. An output terminal 26 of the operational amplifier 22 is connected to an input terminal 28 of the amplifier 24. An output terminal 30 of the amplifier 24 is connected to the output terminal 16 of the power supply 10. The amplifier 24 acts to establish the positive regulated voltage on its output terminal 30 which is directed to the output terminal 16 of the power supply 10.

The negative power supply 14 includes an operational amplifier 32 and an amplifier 38. The operational amplifier 32 includes an output terminal 34 which is connected to an input terminal 36 of the amplifier 38. The amplifier 38 includes an output terminal 40 which is connected to the output terminal 18 of the power supply 10. The amplifier 38 acts to establish the negative regulated voltage on its output terminal 40 which is directed to the output terminal 18 of the power supply 10.

The power supply 10 includes an input terminal 42 to which a positive unregulated voltage is applied, an input terminal 44 to which a negative unregulated voltage is applied and a ground terminal 46 which is connected to the common output terminal 20. Series connected between the input terminals 42 and 44 is a resistor 48, a pair of Zener diodes 50 and 52, and a resistor 54. The Zener diodes 50 and 52 cooperate to form a Zener regulated supply for biasing the operational amplifiers 22 and 32. A pair of terminals 56 and 58 are associated with the Zener diodes 50 and 52, respectively. A positive biasing voltage will be applied to the output terminal 56 and a negative biasing voltage will be applied to the output terminal 58. Suitable leads, not illustrated, will connect the output terminals 56 and 58 to the operational amplifiers 22 and 32 to direct the biasing voltages to the operational amplifiers in a well known manner. The input terminals 42, 44 and 46 are also connected to the amplifiers 24 and 38 to bias the amplifiers 24 and 38 in a well known manner.

Series connected between the terminals 56 and 58 are a capacitor 60 and a resistor 62. A diode 64 has its anode connected to the junction between the capacitor 60 and the resistor 62 and its cathode connected to a positive input terminal 66 of the operational amplifier 22. The capacitor 60, resistor 62 and diode 64 form a positive starting circuit for the power supply 10. The capacitor 60 and resistor 62 form an RC timing circuit which provides a positive starting pulse to the positive input terminal 66 of the operational amplifier 22 when the power supply 10 is energized. Upon initial energization of the power supply 10 the capacitor 60 will start to charge up in a positive direction indicated by the plus sign in the Figure. As the capacitor 60 is charging, a positive voltage will be applied through the diode 64 to the input terminal 66 of the operational amplifier 22 to energize the operational amplifier 22. When the capacitor 60 has become fully charged, it will act to reverse bias the diode 64 so that further positive inputs to the input terminal 66 of the amplifier 22 will be terminated. The start-up voltage applied to the input of amplifier 22 will not be applied to the positive input terminal 67 of operational amplifier 32 as the positive input terminal 67 is connected to the common input 46.

When a positive input is applied to the positive input terminal 66 of the operational amplifier 22 by the starting circuit, the output of the amplifier 22 will go positive and will be applied to the input terminal 28 of the amplifier 24. The application of a positive voltage to the input terminal 28 of the amplifier 24 will effect a positive output voltage at the output terminal 30 thereof. A feedback circuit consisting of a lead 70 and a variable resistor 72 is connected between the output terminal 30 of the amplifier 24 and a negative input terminal 74 of the operational amplifier 22. When the output terminal 30 of the amplifier 24 goes positive, a positive voltage will be applied through the feedback circuit to the negative input terminal 74 of the operational amplifier 22.

Series connected between the output terminal 30 of the amplifier 24 and the output terminal 40 of the amplifier 38 is a resistor 76, a pair of Zener diodes 78 and 80, and a resistor 82. The Zener diodes 78 and 80 are temperature compensating Zener reference diodes and act to apply a reference feedback voltage to lines 84 and 86. The line 84 forms a reference feedback circuit for directing a positive reference feedback voltage to a negative input terminal 88 of the operational amplifier 32 and the line 86 forms a reference feedback circuit to direct a negative reference feedback voltage to the input terminal 74 of the operational amplifier 22. Connected to the output terminal 40 of the amplifier 38 is a feedback circuit which consists of the line 90 and the variable resistor 92 which cooperate to direct a negative feedback voltage to the inverting input terminal 88 of the operational amplifier 32. The voltages applied along the lines 86 and 84 to the operational amplifiers 22 and 32, respectively, will have a magnitude which is generally constant but which will be dependent upon the magnitude of the output of amplifiers 38 and 24, respectively.

When the power supply 10 is energized two inputs will be applied to each of the inverting terminals 74 and 88 of the operational amplifiers 22 and 32, respectively. The input terminal 74 will receive a positive feedback voltage from the feedback circuit consisting of the line 70 and variable resistor 72 and a negative feedback reference voltage directed from the anode of the Zener diode 80 along the line 86. The magnitude of the feedback voltage directed along the line 70 will be dependent upon the magnitude of the voltage on the output terminal 30 of the amplifier 24 and can be controlled by the variable resistor 72. The negative reference feedback voltage directed along the line 86 will generally have a constant magnitude due to the regulation of Zener diodes 78 and 80 and the magnitude of the negative reference voltage will be greater than the magnitude of the positive feedback voltage directed along the line 70 to the input terminal 74. Accordingly, when the negative reference voltage and the positive feedback voltage are summed at the input terminal 74 the resulting voltage will be a negative voltage which will be applied to the inverting input 74 of the operational amplifier 22. The negative voltage applied to the input 74 of the operational amplifier 22 will be inverted and a positive output will occur at the output terminal 26. When a positive output occurs at the output terminal 26, the amplifier 24 will direct a positive regulated voltage to the output terminal 30 thereof and to the output terminal 16 of the power supply 10.

The negative inverting input 88 of the operational amplifier 32 will have a negative feedback voltage applied thereto by the line 90 of the feedback circuit and a positive reference voltage from the line 84 of the reference feedback circuit. The magnitude of the feedback voltage directed along the line 90 will be dependent on the magnitude of the voltage on the output terminal 40 of the amplifier 38 and can be controlled by the variable resistor 92. The positive reference voltage applied by the line 84 will have a constant magnitude due to the regulation of the Zener diodes 78 and 80 and the magnitude of the positive reference voltage will be greater than the magnitude of the negative voltage applied by the line 90 of the feedback circuit. Accordingly, when the voltages are summed at the terminal 88 of the operational amplifier 32 the resulting voltage will be a positive voltage which will be applied to the inverting input 88 of the operational amplifier 32. The positive voltage will be inverted by the operational amplifier 32 and the output terminal 34 thereof will have a negative voltage thereon. The negative voltage on the output terminal 34 will be applied to the amplifier 38 causing the output terminal 40 thereof to have a negative voltage thereon which will be directed to the negative output terminal 18 of the power supply 10.

It should be apparent that the power supply 10 is broken down into two separate power supplies 12 and 14. Each of the power supplies include two feedback circuits associated therewith. The positive power supply 12 includes a first feedback circuit which feeds to the input of the operational amplifier 22, a positive voltage dependent on the output voltage of the amplifier 24 and a first reference feedback circuit which feeds to the input of the operational amplifier 22 a negative voltage, the magnitude of which is dependent on the output voltage of the amplifier 38. The negative power supply 14 includes a second feedback circuit which feeds to the input of the operational amplifier 32 a negative voltage having a magnitude which is dependent upon the output voltage of the amplifier 38 and a second positive reference feedback circuit which directs a positive voltage to the input of the operational amplifier 32 having a magnitude which is dependent upon the output of the amplifier 24. In this manner the feedback circuits of each of the two power supplies are cross referenced and a regulated voltage will be applied to the output terminals 16 and 18 of the power supply 10.

Preferably, the power supply 10 provides a positive 15 volts between the output terminals 16 and the common 20 and a negative 15 volts between the output terminal 18 and the common terminal 20. The feedback reference voltage which is applied by the line 84 to the inverting input of the operational amplifier 32 will be preferably regulated to plus nine volts by the Zener diode 78 and the voltage applied to the inverting input of the operational amplifier 22 by the line 86 will be regulated to a minus nine volts by the Zener regulated diode 80.

Sensing means are associated with the output terminals 16 and 18 for sensing the output regulated voltage thereon. The sensing means associated with the output terminal 16 includes an amplifier 96 having an input terminal 100 connected to the output terminal 16, an input terminal 102 having a positive reference voltage applied thereto and an output terminal 104. THe amplifier 96 operates to compare the output voltage on the terminal 16 with the reference voltage on the input terminal 102. When the regulated output voltage on the output terminal 16 varies by a predetermined amount, the amplifier 96 will emit a signal at the output terminal 104 thereof which will be directed to the input terminal 36 of the amplifier 38. The signal emitted by the amplifier 96 will be a positive signal which will be effective to cancel out the negative signal emitted from the output terminal 34 of the operational amplifier 32 so as to deenergize amplifier 38. Accordingly, when the amplifier 96 applies a signal to the input terminal 36 of the amplifier 38, the amplifier 38 will be deenergized and the power supply 14 will turn off.

Associated with the output terminal 18 of the negative power supply 14 is a sensing means which includes an amplifier 98 having an input terminal 108 connected to the output terminal 18, an input terminal 106 which has a negative reference voltage applied thereto and an output terminal 110 connected to the input terminal 28 of the amplifier 24. The amplifier 98 will act in the manner analogous to the amplifier 96 to sense when the voltage on the output terminal 18 varies by a predetermined amount from a predetermined regulated voltage. When the amplifier 98 senses that the output voltage on the terminal 18 varies by the predetermined amount, a negative signal will be applied to the output terminal 110 of the amplifier 98. The negative signal on the output terminal 110 will be directed to the input terminal 28 of the amplifier 24. The magnitude of the output signal directed from the amplifier 98 to the input of the amplifier 24 will have a magnitude which is effective to cancel out the positive output signal of the operational amplifier 22 on the output terminal 26 thereof. Accordingly, when the amplifier 98 emits an output signal the signal will be effective to cancel out the input on the input terminal 28 of the amplifier 24 to thereby turn off the amplifier 24 and deenergize the positive power supply 12.

It should be apparent that when the sensing means associated with the output terminal 16 senses a predetermined variance of the output voltage, the sensing means will act to turn off the power supply 14. Turning off the power supply 14 will cause the sensing means associated with the output terminal 18 to turn off the power supply 12. Moreover, when the sensing means associated with the output terminal 18 senses a variance in the output voltage thereof the sensing means will act to turn off the power supply 12 and the sensing means associated with the output terminal 16 will then act to turn off the power supply 14. Accordingly, a variance in one of the output voltages associated with the terminals 16 or 18 will effect deenergization of both the positive power supply 12 and the negative power supply 14. Thus, the sensing means associated with the output terminals of the power supply 10 provides positive overload protection in that overload on either or both of the output terminals 16 and 18 will effect deenergization of both the positive and negative power supplies.

From the foregoing it should be apparent that a new and improved regulated power supply has been provided for producing a first positive regulated voltage and a second negative regulated voltage. The power supply includes a pair of cross coupled, self-regulating power supplies which have a first output terminal for producing the first positive regulated voltage and a second terminal for producing the second negative regulated voltage. Sensing means are associated with the output terminals for deenergizing the first regulated power supply in the event the second regulated voltage varies by a predetermined amount and deenergizing the second power supply in the event that the first regulated voltage varies by a predetermined amount. Moreover, positive start-up means are provided for the power supply to insure that the power supply starts upon energization thereof.

What we claim is:

1. A cross reference regulated power supply for generating a first regulated voltage and a second regulated voltage comprising a first regulated power supply having a first input terminal and an output terminal to which the first regulated voltage is applied, a second regulated power supply having a first input terminal and an output terminal to which the second regulated voltage is applied, first sensing means connected to said output terminal of said first regulated power supply for sensing the output voltage applied thereto and directing a signal to said second regulated power supply to deenergize said second regulated power supply in the event the voltage on said output terminal of said first regulated power supply varies by a predetermined amount from a predetermined first regulated voltage, second sensing means connected to said output terminal of said second regulated power supply for sensing the output voltage applied thereto and directing a signal to said first regulated power supply to deenergize said first regulated power supply in the event the voltage on said output terminal of said second power supply varies by a predetermined amount from a predetermined second regulated voltage, a first feedback circuit for directing a voltage to said first input terminal of said first regulated power supply having a magnitude dependent on the voltage on said output terminal of said first power supply and a first reference feedback circuit for directing a reference feedback voltage to said first input terminal of said first regulated power supply having a magnitude dependent on the voltage on said output terminal of said second regulated power supply.

2. A cross reference regulated power supply as defined in claim 1 further including a second feedback circuit for directing a voltage to said first input terminal of said second regulated power supply having a magnitude dependent on the voltage on said output terminal of said second regulated power supply and a second reference feedback circuit for directing a reference feedback voltage to said first input of said second regulated power supply having a magnitude dependent upon the voltage on said output terminal of said first regulated power supply.

3. A cross reference regulated power supply as defined in claim 2 wherein said first regulated power supply includes a first amplifier having a first input terminal connected to said first input terminal of said first regulated power supply and an output terminal and a second amplifier having an input terminal connected to said output terminal of said first amplifier and an output terminal connected to said output terminal of said first regulated power supply and said second regulated power supply includes a third amplifier having an input terminal connected to said first input terminal of said second regulated power supply and an output terminal and a fourth amplifier having an input terminal connected to said output terminal of said third amplifier and an output terminal connected to said output terminal of said second regulated power supply.

4. A cross reference regulated power supply as defined in claim 3 further including a first power supply input terminal, a second power supply input terminal and positive starting means connected between said first power supply input terminal and said second power supply input terminal for starting said first amplifier upon the application of a potential to said first and second power supply input terminals.

5. A cross reference regulated power supply as defined in claim 4 wherein said positive starting means includes a capacitor and a resistor series connected between said first power supply input terminal and said second power supply input terminal and a diode having its anode connected to the junction 82 between said capacitor and said resistor and its cathode connected to a second input terminal of said first amplifier, said resistor and capacitor acting to apply a positive starting potential to said second input of said first amplifier upon the application of a potential to said first and second power supply input terminals, and said capacitor acting to reverse bias said diode when said capacitor charges to a predetermined potential and said positive starting potential has been applied for a predetermined time to said second input terminal of said first amplifier.

6. A cross reference regulated power supply as defined in claim 4 further including a pair of Zener diodes series connected between said first and second power supply input terminals for directing biasing voltages to said first and third amplifiers.

7. A cross reference regulated power supply as defined in claim 3 further including an output common terminal, a first Zener diode having its anode connected to said output common terminal and its cathode connected to said output terminal of said second amplifier, and a second Zener diode having its cathode connected to said output common terminal and its anode connected to said output terminal of said fourth amplifier, said first reference feedback circuit being connected to said anode of said second Zener diode for directing said reference feedback voltage to said first input terminal of said first amplifier, said second reference feedback circuit being connected to said cathode of said first Zener diode for directing said reference feedback voltage to said input terminal of said third amplifier.

8. A cross reference regulated power supply for generating a first regulated voltage and a second regulated voltage comprising a first amplifier having an input terminal and an output terminal, a second amplifier having an input terminal connected to said output terminal of said first amplifier and an output terminal to which the first regulated voltage is applied, a third amplifier having an input terminal and an output terminal, a fourth amplifier having an input terminal connected to said output terminal of said third amplifier and an output terminal to which said second regulated voltage is applied, a first feedback circuit for directing a voltage having a magnitude dependent on the voltage on the output terminal of said second amplifier to said input terminal of said first amplifier, a first reference feedback circuit for directing a reference feedback voltage having a magnitude dependent on the voltage on said output terminal of said fourth amplifier to said input terminal of said first amplifier, a second feedback circuit for directing a voltage having a magnitude dependent on the voltage on said output terminal of said fourth amplifier to said input terminal of said third amplifier, a second reference feedback circuit for directing a reference feedback voltage having a magnitude dependent on the voltage on said output terminal of said second amplifier to said input terminal of said third amplifier, first sensing means for sensing the voltage on said output terminal of said second amplifier and directing a signal to said input terminal of said fourth amplifier when the output voltage on said output terminal of said second amplifier varies by a predetermined amount to deenergize said fourth amplifier and second sensing means for sensing the voltage on said output terminal of said fourth amplifier and directing a signal to said input terminal of said second amplifier when the voltage on said output terminal of said fourth amplifier varies by a predetermined amount to deenergize said second amplifier.

9. A cross reference regulated power supply as defined in claim 8 wherein said first sensing means includes a fifth amplifier having an input terminal connected to said output terminal of said second amplifier and an output terminal connected to said input terminal of said fourth amplifier and operable to deenergize said fourth amplifier in the event the output voltage on said output terminal of said second amplifier varies by a predetermined amount from a first predetermined output voltage and said second sensing means includes a sixth amplifier having an input terminal connected to said output terminal of said fourth amplifier and an output terminal connected to said input terminal of said second amplifier and operable to deenergize said second amplifier in the event the voltage on said output terminal of said fourth amplifier varies by a predetermined amount from a second predetermined output voltage.

10. A cross reference regulated power supply as defined in claim 8 further including a first power supply input terminal, a second power supply input terminal, and positive starting means connected between said first and second power supply input terminals for starting operation of said first amplifier upon the application of a potential to said first and second power supply input terminals.

11. A cross reference regulated power supply as defined in claim 10 wherein said positive starting means includes a capacitor and a resistor series connected between said first and second power supply input terminals and a diode having its anode connected to the junction between said capacitor and said resistor and its cathode connected to a second input terminal of said first amplifier, said resistor and capacitor acting to apply a positive starting potential to said second input terminal of said first amplifier upon the application of a potential to said first and second power supply input terminals, said capacitor acting to reverse bias said diode when said capacitor charges to a predetermined potential and said positive starting potential has been applied for a predetermined time to said second input terminal of said first amplifier.

12. A cross reference regulated power supply as defined in claim 11 further including a pair of Zener diodes series connected between said first and second power supply input terminals for directing biasing voltages to said first and third amplifiers.

13. A cross reference regulated power supply as defined in claim 8 further including an output common terminal, a first Zener diode having its anode connected to said output common terminal and its cathode connected to said output terminal of said second amplifier, and a second Zener diode having its cathode connected to said output common terminal and its anode connected to said output terminal of said fourth amplifier, said first reference feedback circuit being connected to said anode of said second Zener diode for directing said reference feedback voltage to said input terminal of said first amplifier, said second reference feedback circuit being connected to said cathode of said first Zener diode for directing said reference feedback voltage to said first input terminal of said third amplifier.

14. A cross reference regulated power supply for generating a first regulated voltage and a second regulated voltage comprising a first regulated power supply having a first input terminal and an output terminal to which the first regulated voltage is applied, a second regulated power supply having a first input terminal and an output terminal to which the second regulated voltage is applied, first sensing means connected to said output terminal of said first regulated power supply for sensing the output voltage applied thereto and directing a signal to said second regulated power supply to deenergize said second regulated power supply in the event the voltage on said output terminal of said first regulated power supply varies by a predetermined amount from a predetermined first regulated voltage, second sensing means connected to said output terminal of said second regulated power supply for sensing the output voltage applied thereto and directing a signal to said first regulated power supply to deenergize said first regulated power supply in the event the voltage on said output terminal of said second power supply varies by a predetermined amount from a predetermined second regulated voltage, a first feedback circuit for directing a voltage to said first input terminal of said first regulated power supply having a magnitude dependent on the voltage on said output terminal of said first power supply, a first reference feedback circuit for directing a reference feedback voltage to said first input terminal of said first regulated power supply having a magnitude dependent on the voltage on said output terminal of said second regulated power supply, a second feedback circuit for directing a voltage to said first input terminal of said second regulated power supply having a magnitude dependent on the voltage on said output terminal of said second regulated power supply and a second reference feedback circuit for directing a reference feedback voltage to said first input of said second regulated power supply having a magnitude dependent upon the voltage on said output terminal of said first regulated power supply, said first regulated power supply including a first amplifier having a first input terminal connected to said first input terminal of said first regulated power supply and an output terminal and a second amplifier having an input terminal connected to said output terminal of said first amplifier and an output terminal connected to said output terminal of said first regulated power supply, said second regulated power supply including a third amplifier having an input terminal connected to said first input terminal of said second regulated power supply and an output terminal and a fourth amplifier having an input terminal connected to said output terminal of said third amplifier and an output terminal connected to said output terminal of said second regulated power supply, said first sensing means including a fifth amplifier having an input terminal connected to said output terminal of said second amplifier and an output terminal connected to said input terminal of said fourth amplifier and operable to deenergize said fourth amplifier in the event the output voltage on said output of said second amplifier varies by a predetermined amount, said second sensing means including a sixth amplifier having an input terminal connected to said output terminal of said fourth amplifier and an output terminal connected to said input terminal of said second amplifier and operable to deenergize said second amplifier in the event the voltage on the output terminal of said fourth amplifier varies by a predetermined amount.

* * * * *